(12) United States Patent
Xin et al.

(10) Patent No.: US 12,099,346 B1
(45) Date of Patent: Sep. 24, 2024

(54) LARGE-SCALE DYNAMIC DOUBLE-EFFECT SCHEDULING METHOD FOR FLEXIBLE JOB SHOP BASED ON GENETIC PROGRAMMING

(71) Applicant: Beijing Institute of Technology, Beijing (CN)

(72) Inventors: Bin Xin, Beijing (CN); Yingmei He, Beijing (CN); Sai Lu, Beijing (CN); Fang Deng, Beijing (CN); Qing Wang, Beijing (CN); Mengjie Jing, Beijing (CN); Jiwei He, Beijing (CN)

(73) Assignee: Beijing Institute of Technology, Beijing (CN)

( * ) Notice: Subject to any disclaimer, the term of this patent is extended or adjusted under 35 U.S.C. 154(b) by 0 days.

(21) Appl. No.: 18/648,438

(22) Filed: Apr. 28, 2024

(30) Foreign Application Priority Data

Nov. 8, 2023 (CN) .......................... 202311477049.1

(51) Int. Cl.
  *G05B 13/04* (2006.01)
  *G05B 13/02* (2006.01)
  *G05B 19/418* (2006.01)

(52) U.S. Cl.
  CPC ... *G05B 19/41845* (2013.01); *G05B 13/0265* (2013.01); *G05B 13/04* (2013.01)

(58) Field of Classification Search
  CPC .............................. G05B 13/0265; G05B 13/04
  (Continued)

(56) References Cited

U.S. PATENT DOCUMENTS

| 2005/0143845 A1* | 6/2005 | Kaji | G06N 3/126 700/28 |
| 2007/0005522 A1* | 1/2007 | Wren | G06N 3/126 706/13 |

(Continued)

FOREIGN PATENT DOCUMENTS

| CN | 106250583 A | 12/2016 |
| CN | 111242503 A | 6/2020 |

(Continued)

OTHER PUBLICATIONS

Dynamic scheduling of manufacturing job shops using genetic algorithms, By:George (Year: 2000).*

(Continued)

*Primary Examiner* — Jigneshkumar C Patel

(57) ABSTRACT

Disclosed is a large-scale dynamic double-effect scheduling method for a flexible job shop based on genetic programming (GP). In a GP implementation process of the present disclosure, in addition to features related to workpieces, processing robots and automated guided vehicles (AGVs), such as processing time of working procedures and buffer area waiting time, features of a ratio of processing time to transfer time and a ratio of processing energy consumption to transfer energy consumption are also added in a terminal set to cause job shop environment features to be more comprehensively applied to a scheduling rule design, thereby automatically designing a more consistent and accurate scheduling rule. A double-effect scheduling rule of the present disclosure overcomes the shortcomings of slow convergence speed, difficulty in rapid corresponding changes and unfit scheduling rules, and can quickly produce a more efficient and energy-saving production scheduling scheme.

10 Claims, 8 Drawing Sheets

(58) Field of Classification Search
USPC .......................................................... 700/96
See application file for complete search history.

(56) References Cited

U.S. PATENT DOCUMENTS

| | | | |
|---|---|---|---|
| 2020/0026264 A1* | 1/2020 | Zhu | G06Q 10/04 |
| 2024/0177251 A1* | 5/2024 | Wu | G06F 17/18 |

FOREIGN PATENT DOCUMENTS

| | | |
|---|---|---|
| CN | 113805545 A | 12/2021 |
| CN | 115392616 A | 11/2022 |

OTHER PUBLICATIONS

Online Multiobjective Single Machine Dynamic Scheduling With Sequence-Dependent Setups Using Simulation-Based Genetic Algorithm With Desirability Function, By: Adeline (Year: 2007).*

* cited by examiner

LARGE-SCALE DYNAMIC DOUBLE-EFFECT SCHEDULING METHOD FOR FLEXIBLE JOB SHOP BASED ON GENETIC PROGRAMMING

CROSS-REFERENCE TO RELATED APPLICATIONS

This application claims priority of Chinese Patent Application No. 202311477049.1, filed on Nov. 8, 2023, the entire contents of which are incorporated herein by reference.

TECHNICAL FIELD

The present disclosure relates to the technical field of production scheduling, and in particular to a large-scale dynamic double-effect scheduling method for a flexible job shop based on genetic programming (GP).

BACKGROUND

With the development of technology, processing robots in job shops have broken through the rigid constraints of resources and have the ability to process more types of working procedures. The scheduling problems of a flexible job shop can be divided into two sub-problems: routing problem and scheduling problem. The routing sub-problem refers to arranging each of working procedures to a given processing robot; and the scheduling sub-problem refers to sorting working procedures assigned to all processing robots to obtain a feasible schedule with a satisfactory objective function.

Automated guided vehicles (AGVs) have been widely applied in the field of logistics transportation. In order to save manpower cost and improve transfer efficiency, the AGVs will also be widely applied in manufacturing job shops. In general, due to the interrelated coupling between a processing link and a handling link, a handling time of the AGV cannot be ignored and a handling scheme has a great impact on the productivity of job shop, so the double-effect scheduling problem of the flexible job shop arises from this.

Job shop environments can be divided into a static environment and a dynamic environment. In the static job shop environment, resources to be scheduled in the job shop are all known and unchanged, including the numbers of workpieces and processing robots, and only one scheduling scheme is generated in an initial state of the job shop. However, in the dynamic environment, a new scheduling scheme needs to be generated in real time according to a changing job shop environment, such as the arrival of workpieces at any time. The dynamic job shop environment is more in line with an actual production situation, but also brings more challenges. An ever-changing environment has higher requirements for the rapidity of algorithm.

In view of the above demands, heuristic scheduling rules with fast response speeds can generate new scheduling schemes for environmental changes in real time, and are more suitable for dynamic scheduling. In addition, the scheduling rules are simple and easy to implement, and widely applied in job shop scheduling in reality. Moreover, since scheduling rules are difficult to design directly and manually in a complex job shop environment, there is an urgent need for a practical automatic rule design method to design effective rules for more general dynamic job shop scheduling problems.

SUMMARY

In view of this, the present disclosure provides a large-scale dynamic double-effect scheduling method for a flexible job shop based on GP, which can solve the technical problem that, in the prior art, the automatic rule design for the joint dynamic job shop scheduling of processing robots and AGVs does not be considered. For the demands of quick response to changes in a job shop environment in dynamic scheduling, such as the random arrival of a new order, a heuristic scheduling rule capable of quickly constructing a scheduling scheme is designed and the designed rule is simple and easy to implement, which can be widely applied in actual job shop scheduling. Because the scheduling rules are related to a ratio of the numbers of processing robots and AGVs and a ratio of average processing time and average handling time, and are affected by different job shop environments and different optimization objectives, it is difficult to directly and manually design scheduling rules in a complex job shop environment, and it is often necessary to formulate corresponding scheduling rules. Therefore, the automatic design of scheduling rules based on GP algorithm is adopted to automatically customize rules for different flexible job shops.

In order to solve the above technical problems, the present disclosure is realized as follows.

A large-scale dynamic double-effect scheduling method for a flexible job shop based on GP includes the steps of:

step S1: acquiring information about processing robots, information about AGVs and information about workpieces to be processed of a flexible job shop in a training example; and initializing parameters of the flexible job shop on the basis of the information about processing robots, the information about AGVs and the information about workpieces to be processed of the flexible job shop, and constructing a multiple objective function for minimizing order completion time and energy consumption;

step S2: setting GP algorithm parameters, constructing individuals in a rule tree form, initializing a chromosome population, and setting a current number of iteration num as 0;

step S3: evaluating fitness values of individuals in the chromosome population through dynamic simulation according to the multiple objective function constructed in step S1;

step S4: selecting parent individuals from the chromosome population by using a non-dominated rank and crowding degree sorting method, recording a population composed of the parent individuals as a preferred parent population, and putting individuals with the highest non-dominated rank in the preferred parent population into an archive set; and performing crossover and mutation operations on the preferred parent population to obtain a current chromosome population;

step S5: determining whether a current number of iteration num reaches a set value NUM, if so, this operation being ended and step S6 being entered; and if not, the current number of iteration num being increased by 1, the current chromosome population being taken as a chromosome population, and step S3 being entered;

step S6: acquiring information about processing robots, information about AGVs and information about workpieces to be processed of a flexible job shop in a test example; and initializing parameters of the flexible job shop on the basis of the information about processing robots, the information about AGVs and the information about workpieces to be processed of the flexible job shop;

step S7: performing dynamic simulation by using scheduling rules represented by the individuals in the archive set, and obtaining corresponding scheduling schemes and fitness values thereof;

step S8: comparing the obtained fitness values of the scheduling schemes to obtain a non-dominated individual set; and step S9: selecting an appropriate scheduling scheme according to demand preferences, followed by executing to complete double-effect scheduling.

Preferably, in step S1, the information about processing robots includes the number of processing robots, the technological processing capacity of processing robots and fixed-point positions of processing robots; the information about AGVs includes the number of AGVs, running speeds of AGVs and initial positions of AGVs; and the information about workpieces to be processed includes the number of workpieces to be processed, the number of working procedures for the workpieces to be processed, and available processing robots for each of working procedures and processing durations thereof.

Preferably, in step S1, the constructed multiple objective function is:

$$\min F=[C_{max}, E_{total}]^T$$

where $C_{max}$ is a completion time of a job shop order, and $E_{total}$ is total energy consumption of a job shop.

Preferably, in step S2, the GP algorithm parameters include a chromosome population size, a crossover probability, a mutation probability, the number of iterations and a depth of a rule tree.

Preferably, in step S2, the individuals in the rule tree form are constructed, each of the individuals represents a scheduling rule, and the rule tree is a priority function composed of a terminal set and a function set, the terminal set reflecting features of a job shop state being taken as leaf nodes of the rule tree, and the features of the job shop state reflected by the terminal set including the number of remaining working procedures, processing time of working procedures and a time for a workpiece to wait for an AGV to arrive; and the function set, as a function symbol, including {+, −, ×, ÷, max, min, if}, and the function symbol associating the features of the job shop as internal nodes of the rule tree to generate a rule tree.

Preferably, in step S2, the chromosome population includes N chromosomes, and each of the chromosomes is a rule tree; generation methods for the chromosome population include a full method and a grow method, and the two generation methods separately generate half of the chromosome population; in the full method, a complete tree is constructed, leaf nodes are all at the maximum depth level, the leaf nodes are randomly selected from the terminal set, and remaining nodes are all selected from the terminal set; and in the grow method, a complete tree does not require to be constructed, all nodes may be randomly selected from the terminal set and the function set, and terminal symbols are selected as leaf nodes and function symbols are selected as internal nodes through probabilities to recursively construct a rule tree, to generate individuals with different depths and structures.

Preferably, in step S3, a method for evaluating fitness values of individuals in the chromosome population through dynamic simulation includes the steps of:

step S31: decoding rule trees represented by individuals to obtain a priority function for a processing sequence of working procedures, a decoding process being hierarchical decoding, and an expression of each layer in the rule tree being the same level; and the decoding being started from leaf nodes of the lowest layer of the rule tree, a function set directly connected to the leaf nodes being taken as an operator, all leaf nodes of a next layer connected to the operator being formed by the operator as an operation expression, and the operation expression being regarded as a new leaf node to perform the above same calculation until the entire rule tree is decoded into an expression, namely, the priority function;

step S32: substituting a corresponding numerical value related to each of the working procedures in the job shop into the priority function for calculation according to the above obtained priority function, to obtain a priority of each of the working procedures; and step S33: sequentially assigning a processing robot and an AGV that best meet an objective function to each of the working procedures according to the obtained priority, to obtain scheduling schemes of all orders, and calculating fitness values of two objectives of order completion time and energy consumption of the scheduling schemes.

Preferably, in step S4, a method for selecting parent individuals from the chromosome population by using a non-dominated rank and crowding degree sorting method includes the steps of:

step S41: directly taking a first generation chromosome population as a preferred parent population and skipping the following steps if a current generation chromosome set is a first generation chromosome, and forming a current generation chromosome $P_1$ and a previous generation chromosome into a chromosome set $Q_1$ if a current generation chromosome set is not a first generation chromosome;

step S42: obtaining a Pareto dominated individual set P and a dominated individual set S of each of the individuals according to fitness values of two objectives of order completion time and energy consumption of an individual in the above chromosome set $Q_1$, a Pareto dominated individual meaning that, in a minimization problem, if a certain target fitness value of an individual A is less than or equal to a corresponding target fitness value of an individual B, and another target fitness value of the individual A is less than the corresponding target fitness value of the individual B, the individual A dominates the individual B, and the individual B is a Pareto dominated individual of the individual A;

step S43: setting the non-dominated rank as rank, and setting an initial value of rank as 0;

step S44: finding all individuals that are not dominated, namely, individuals with empty sets S, according to a Pareto dominated solution set of each of the individuals to form a non-dominated individual set, ranks of the individuals in the non-dominated individual set being all increased by 1;

step S45: deleting individuals with minimum values of the above rank, and updating S sets of individuals in a P set according to the P set of the individual, namely, deleting individuals with minimum values of the rank in the S set; and determining whether there is an individual with an unlabeled rank in the chromosome set, if so, step S44 being skipped to; and if not, individuals with the highest rank being stored into the archive set after ranks are labeled, that is, individuals with minimum values of the rank being stored into the archive set, and step S46 being skipped to; and step S46: putting individuals contained in first n ranks with minimum values of the rank into the preferred parent population, ensuring that individuals in first n−1 ranks are less than a specified population number, and performing crowding degree sorting on individuals in an $n^{th}$ rank when individuals in first n ranks are more than the specified population number, the crowding degree sorting meaning that all the individuals in the $n^{th}$ rank are put into a two-dimensional coordinate system plane composed of two objective function values according to the fitness values of the two objectives, left and right individuals closest to each of the individuals in the two-dimensional coordinate system plane are found, two closest individuals being called neighbors of a present individual, and a Manhattan distance of the two neighbors is calculated and recorded as a crowding degree of the present individual, where if the present individual has no neighbors, the crowding degree of the present individual is set to infinity, and the individuals are sorted in descending order according to the crowding degree to obtain the crowding degree sorting; and last m individuals are deleted according to a sorting sequence of crowding degree to cause the total number of the individuals in the first n ranks after a deletion operation is the specified population number.

Preferably, in step S4, a method for performing a crossover operation on the preferred parent population includes the steps of: selecting two non-selected individuals, deciding whether to execute a crossover operation according to the crossover probability, randomly selecting a node of the rule tree in the individual if the crossover operation is executed, exchanging a subtree with the node as a root node to obtain two new individuals, and repeating the above steps until all individuals are executed for crossover operations.

Preferably, in step S4, a method for performing a mutation operation on the preferred parent population includes the steps of: performing a mutation operation on the preferred parent population after the crossover operation: deciding, by an individual, whether to execute a mutation operation according to the mutation probability, randomly selecting a node of the rule tree in the individual if the mutation operation is executed, randomly selecting a node of another individual as a subtree of a root node to replace a subtree of the individual to obtain a new individual, and performing the above operations on all the individuals in the chromosome population to obtain a current generation chromosome population.

Preferably, in step S8, a method for obtaining a non-dominated individual set includes the steps of:
step S81: calculating a Pareto dominated individual set P and a dominated individual set S of each of the individuals according to the scheduling schemes and the fitness values thereof of the individuals in the archive set in step S7; and
step S82: finding all individuals that are not dominated, namely, individuals with empty sets S, according to a Pareto dominated solution set of each of the individuals to form a non-dominated individual set.
Preferably, step S9 includes:
an appropriate scheduling scheme is selected according to demand preferences, the demand preference referring to a balance between two objectives of order completion time and energy consumption, and a required scheduling scheme is selected and executed.

An example of the present disclosure also provides a computer-readable storage medium, having stored a computer program thereon, which, when executed by a processor, implements the above large-scale dynamic double-effect scheduling method for a flexible job shop based on GP.

The present disclosure has the following advantageous effects.

The present disclosure provides a large-scale dynamic double-effect scheduling method for a flexible job shop based on GP, which can solve the problems of automatic design of scheduling rules and real-time generation of new scheduling schemes for environmental changes in dynamic scheduling. In a GP implementation process of the present disclosure, in addition to features related to workpieces, processing robots and AGVs, such as processing time of working procedures and buffer area waiting time, features of a ratio of processing time to transfer time and a ratio of processing energy consumption to transfer energy consumption are also added in a terminal set to cause job shop environment features to be more comprehensively applied to a scheduling rule design, thereby generating a more consistent and accurate scheduling rule. In the case of strong coupling between processing and transportation, a routing rule, a processing robot scheduling rule and an AGV task allocation rule are simultaneously evolved to obtain a double-effect scheduling rule, which overcomes the shortcomings of slow convergence speed, difficulty in rapid corresponding changes and unfit scheduling rules, and can quickly produce a more efficient and energy-saving production scheduling scheme.

DETAILED DESCRIPTION

Hereinafter, the present disclosure will be described in detail with the attached drawings and examples.

Figure 1:
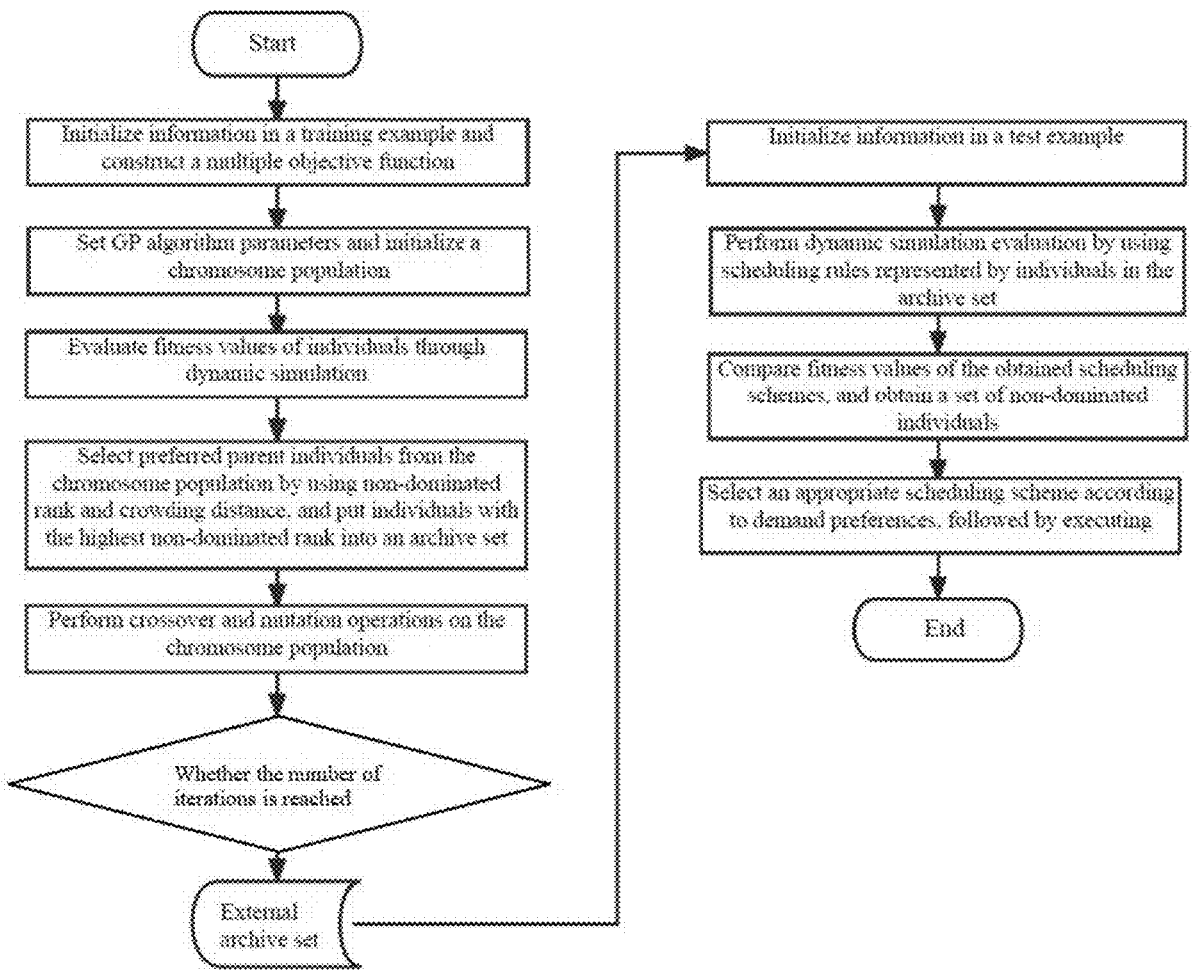
FIG. 1 shows a flow chart of a large-scale dynamic double-effect scheduling method for a flexible job shop based on GP of the present disclosure.

As shown in FIG. 1, a large-scale dynamic double-effect scheduling method for a flexible job shop based on GP of the present disclosure includes the following steps.

Figure 2:
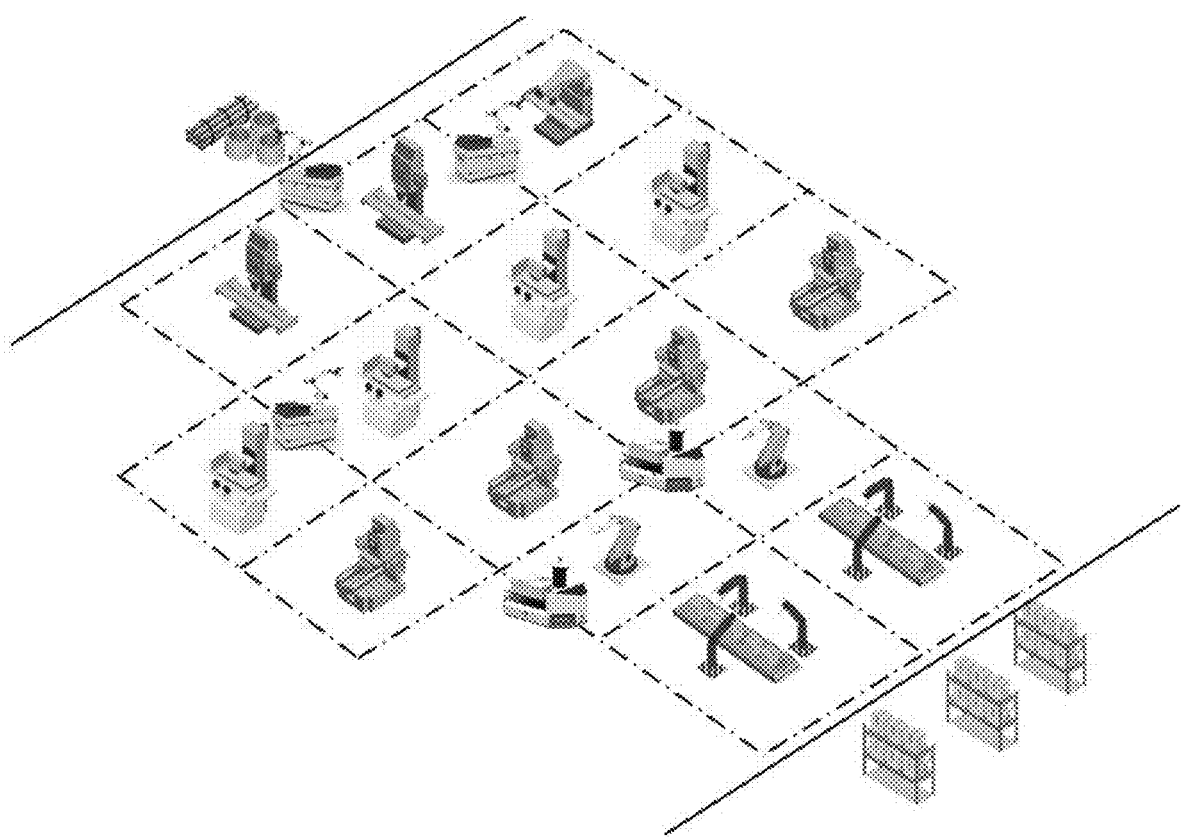
FIG. 2 shows a schematic diagram of a job shop of the large-scale dynamic double-effect scheduling method for a flexible job shop based on GP of the present disclosure.
Figure 3:
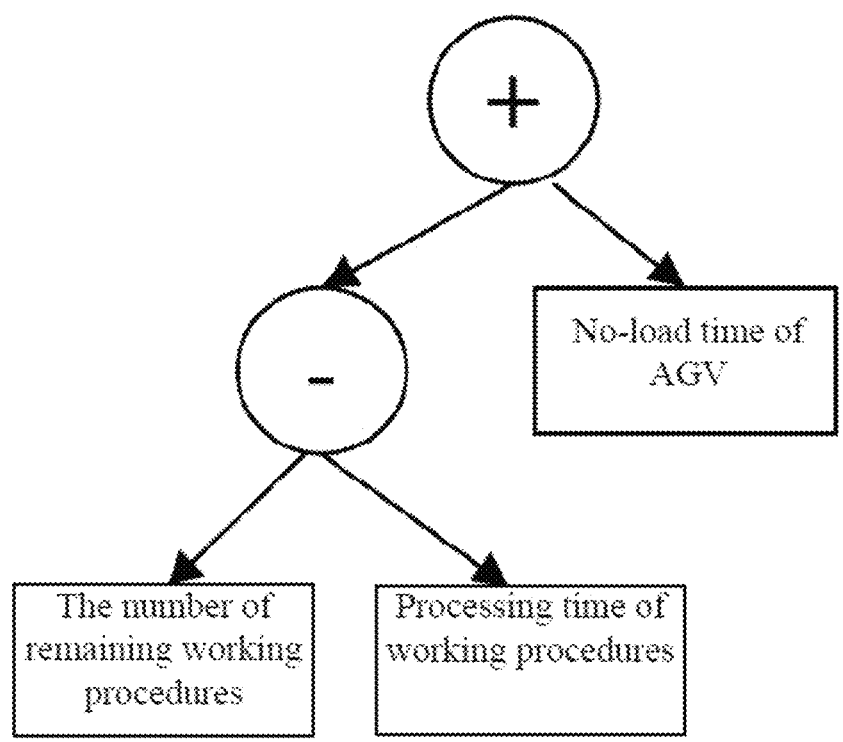
FIG. 3 shows a schematic diagram of a rule tree of the present disclosure.

In step S1: as shown in FIG. 2, information about processing robots, information about AGVs and information about workpieces to be processed of a flexible job shop in a training example are acquired; and parameters of the flexible job shop are initialized on the basis of the information about processing robots, the information about AGVs and the information about workpieces to be processed of the flexible job shop, as shown in FIG. 3, and a multiple objective function for minimizing order completion time and energy consumption is constructed.

In step S2: GP algorithm parameters are set, individuals in a rule tree form are constructed, a chromosome population is initialized, and a current number of iteration num is set as 0.

Figure 4:
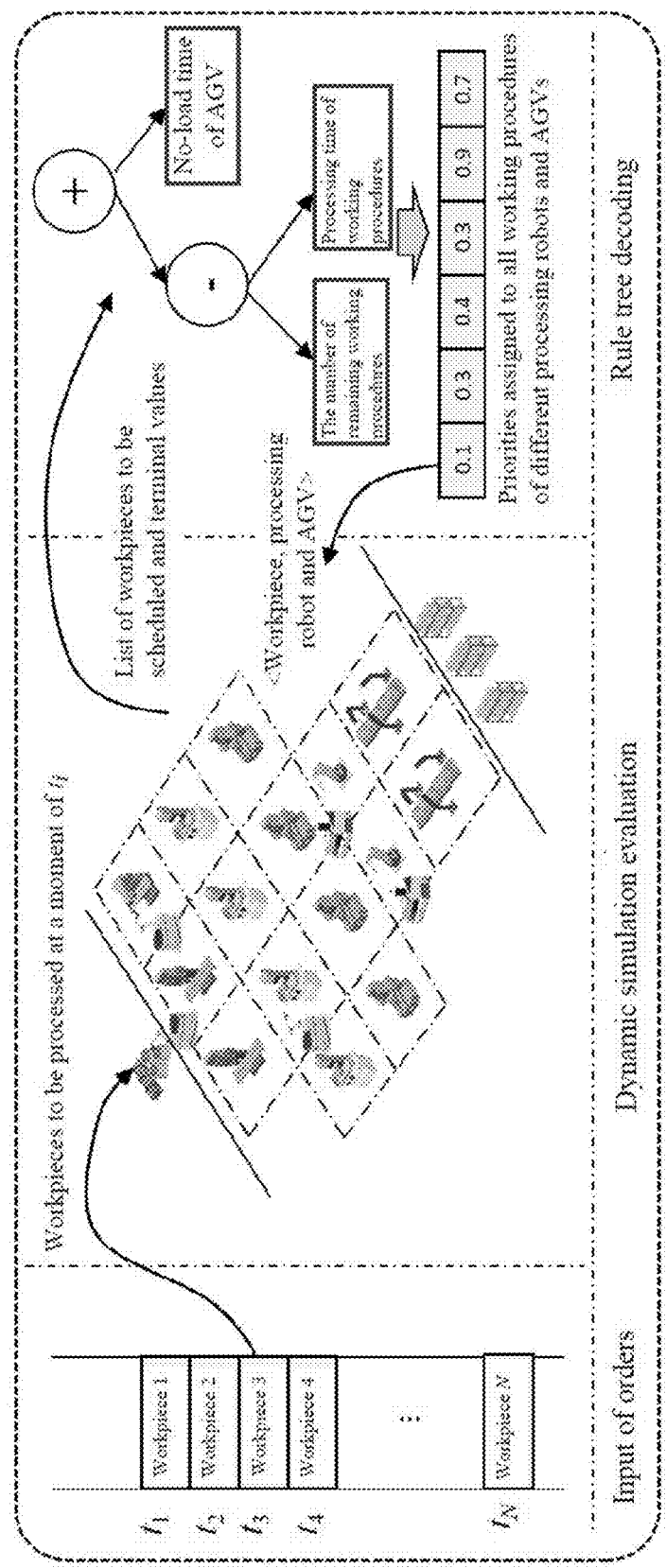
FIG. 4 shows a schematic diagram of a dynamic simulation evaluation process of the present disclosure.

In step S3: as shown in FIG. 4, fitness values of individuals are evaluated through dynamic simulation according to the multiple objective function constructed in step S1.

Figure 5:
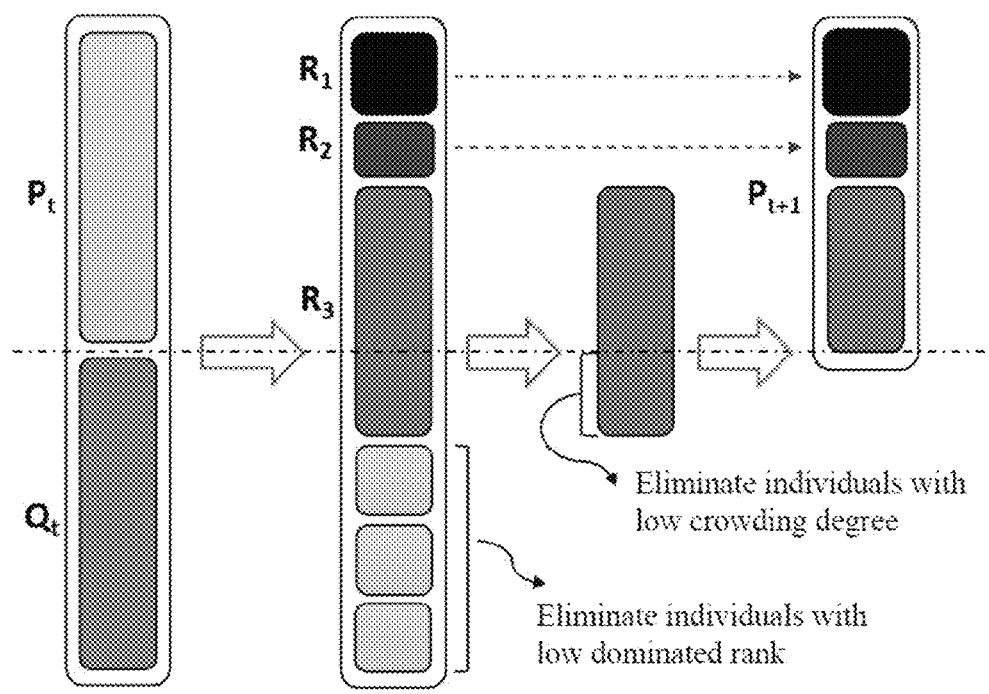
FIG. 5 shows a schematic diagram of selecting preferred parents on the basis of non-dominated ranks and crowding degrees of the present disclosure.
Figure 7:
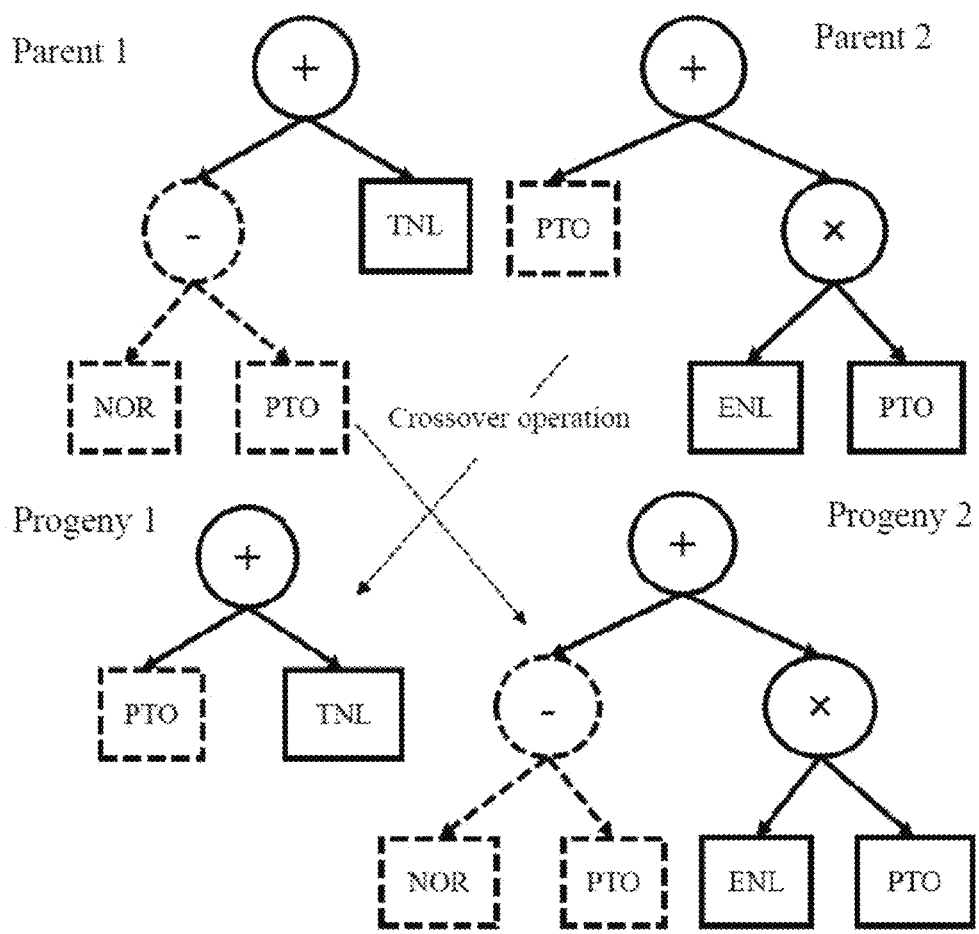
FIG. 7 shows a chromosome crossover operation diagram of the present disclosure.
Figure 8:
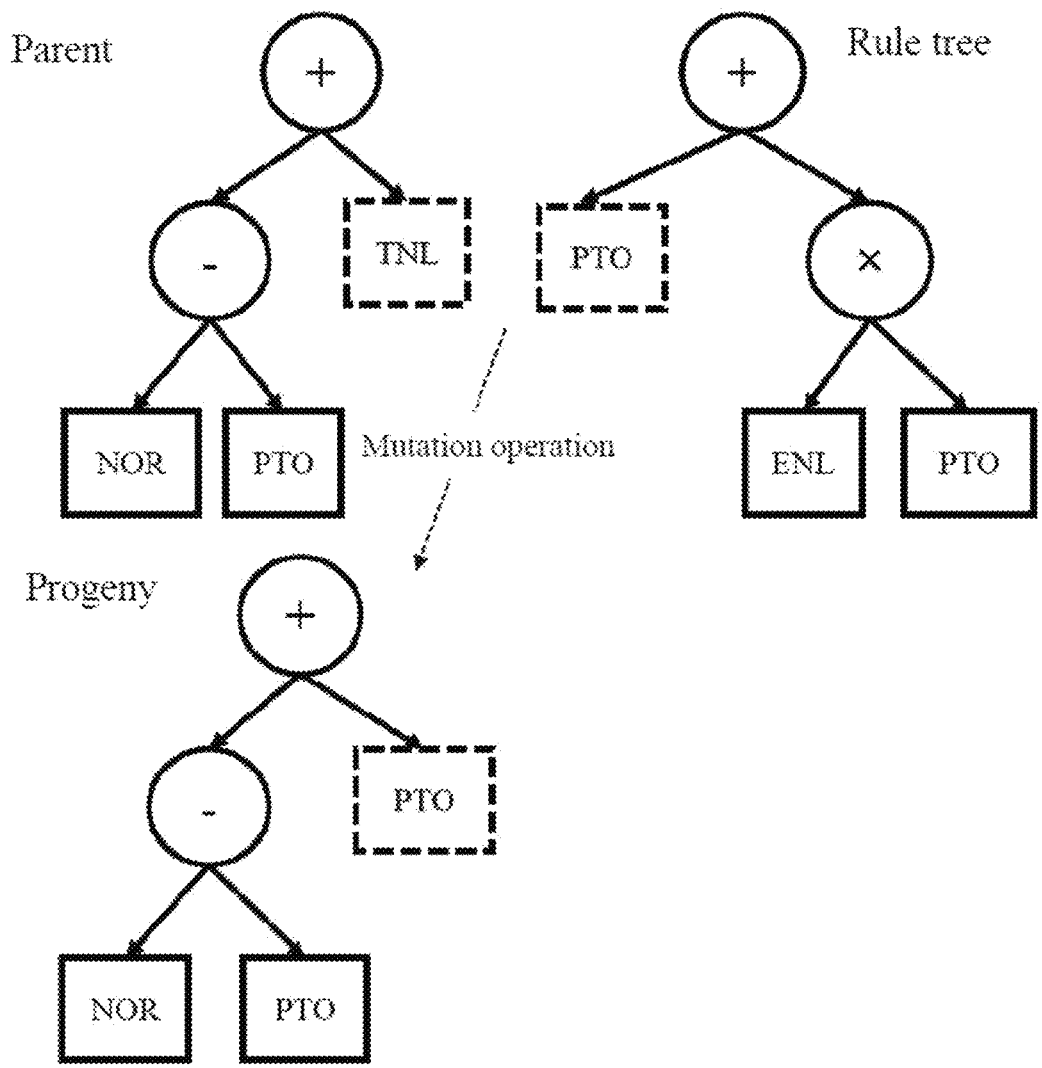
FIG. 8 shows a chromosome mutation operation diagram of the present disclosure.

In step S4: as shown in FIG. 5, parent individuals are selected from the chromosome population by using a non-dominated rank and crowding degree sorting method, a population composed of the parent individuals is recorded as a preferred parent population, and individuals with the highest non-dominated rank in the preferred parent population are put into an archive set; and as shown in FIGS. 7 and 8, crossover and mutation operations are performed on the preferred parent population to obtain a current chromosome population.

In step S5: whether a current number of iteration num reaches a set value NUM is determined, if so, this operation is ended and step S6 is entered; and if not, the current number of iteration num is increased by 1, the current chromosome population is taken as a chromosome population, and step S3 is entered.

In step S6: information about processing robots, information about AGVs and information about workpieces to be processed of a flexible job shop in a test example are acquired; and parameters of the flexible job shop are initialized on the basis of the information about processing robots, the information about AGVs and the information about workpieces to be processed of the flexible job shop.

In step S7: dynamic simulation evaluation is performed by using scheduling rules represented by the individuals in the archive set, and corresponding scheduling schemes and fitness values thereof are obtained.

In step S8: the obtained fitness values of the scheduling schemes are compared to obtain a non-dominated individual set.

In step S9: an appropriate scheduling scheme is selected according to demand preferences, followed by executing.

In step S1, the information about processing robots includes the number of processing robots, the technological processing capacity of processing robots and fixed-point positions of processing robots; the information about AGVs includes the number of AGVs, running speeds of AGVs and initial positions of AGVs; and the information about workpieces to be processed includes the number of workpieces to be processed, the number of working procedures for the workpieces to be processed, and available processing robots for each of working procedures and processing durations thereof.

In step S1, the constructed multiple objective function to minimize order completion time and energy consumption is:

$$\min F=[C_{max}, E_{total}]^T$$

where $C_{max}$ is a completion time of a job shop order, and $E_{total}$ is total energy consumption of a job shop.

In step S2, the GP algorithm parameters include a chromosome population size, a crossover probability, a mutation probability, the number of iterations and a depth of a rule tree.

In step S2, the individuals in the rule tree form are constructed, each of the individuals represents a scheduling rule, and the rule tree is a priority function composed of a terminal set and a function set, the terminal set reflecting features of a job shop state being taken as leaf nodes of the rule tree, and the features of the job shop state reflected by the terminal set including the number of remaining working procedures, processing time of working procedures and a time for a workpiece to wait for an AGV to arrive; and the function set, as a function symbol, including {+, −, ×, =, max, min, if}, and the function symbol associating the features of the job shop as internal nodes of the rule tree to generate a rule tree.

In step S2, the chromosome population includes N chromosomes, and each of the chromosomes is a rule tree; generation methods for the chromosome population include a full method and a grow method, and the two generation methods separately generate half of the chromosome population; in the full method, a complete tree is constructed, leaf nodes are all at the maximum depth level, the leaf nodes are randomly selected from the terminal set, and remaining nodes are all selected from the terminal set; and in the grow method, a complete tree does not require to be constructed, all nodes may be randomly selected from the terminal set and the function set, and terminal symbols are selected as leaf nodes and function symbols are selected as internal nodes through probabilities to recursively construct a rule tree, to generate individuals with different depths and structures.

In step S3, a method for evaluating fitness values of individuals in the chromosome population through dynamic simulation includes the following steps.

In step S31: rule trees represented by individuals are decoded to obtain a priority function for a processing sequence of working procedures, a decoding process being hierarchical decoding, an expression of each layer in the rule tree being the same level; and the decoding being started from leaf nodes of the lowest layer of the rule tree, a function set directly connected to the leaf nodes being taken as an operator, all leaf nodes of a next layer connected to the operator being formed by the operator as an operation expression, and the operation expression being regarded as a new leaf node to perform the above same calculation until the entire rule tree is decoded into an expression, namely, the priority function.

In step S32: a corresponding numerical value related to each of the working procedures in the job shop is substituted into the priority function for calculation according to the above obtained priority function, to obtain a priority of each of the working procedures.

In step S33: a processing robot and an AGV that best meet an objective function are sequentially assigned to each of the working procedures according to the obtained priority sequence, to obtain scheduling schemes of all orders, and fitness values of two objectives of order completion time and energy consumption of the scheduling schemes are calculated.

In step S4, a method for selecting parent individuals from the chromosome population by using a non-dominated rank and crowding degree sorting method includes the following steps.

In step S41: a first generation chromosome population is directly taken as a preferred parent population and the following steps are skipped if a current generation chromosome set is a first generation chromosome, and a current generation chromosome $P_1$ and a previous generation chromosome are formed into a chromosome set $Q_1$ if a current generation chromosome set is not a first generation chromosome.

In step S42: a Pareto dominated individual set P and a dominated individual set S of each of the individuals are obtained according to fitness values of two objectives of order completion time and energy consumption of an individual in the above chromosome set $Q_1$, a Pareto dominated individual meaning that, in a minimization problem, if a certain target fitness value of an individual A is less than or equal to a corresponding target fitness value of an individual B, and another target fitness value of the individual A is less than the corresponding target fitness value of the individual B, the individual A dominates the individual B, and the individual B is a Pareto dominated individual of the individual A.

In step S43: the non-dominated rank is set as rank, and an initial value of rank is set as 0.

In step S44: all individuals that are not dominated, namely, individuals with empty sets S, are found according to a Pareto dominated solution set of each of the individuals to form a non-dominated individual set, ranks of individuals in the non-dominated individual set being all increased by 1.

In step S45: individuals with minimum values of the above rank are deleted, and S sets of individuals in a P set are updated according to the P set of the individual, that is, individuals with minimum values of the rank in the S set are deleted; and whether there is an individual with an unlabeled rank in the chromosome set is determined, if so, step S44 is skipped to; and if not, individuals with the highest rank are stored into the archive set after ranks are labeled, that is, individuals with minimum values of the rank are stored into the archive set, and step S46 is skipped to.

Figure 6:
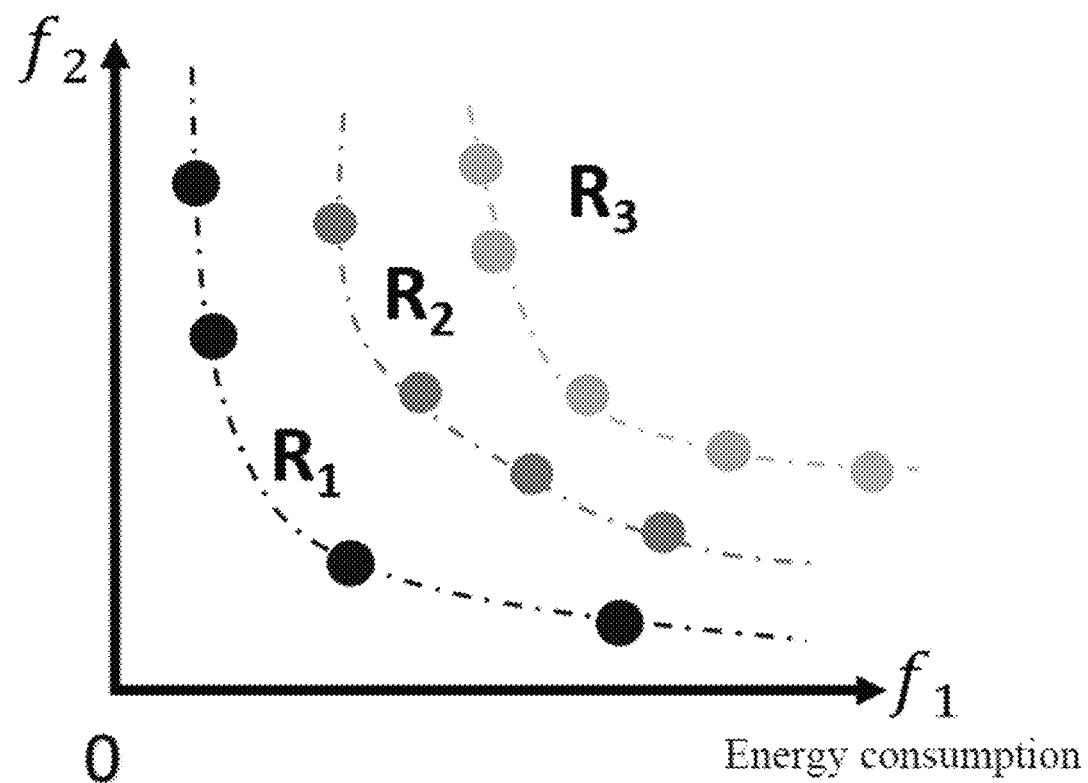
FIG. 6 shows a schematic diagram of a two-dimensional coordinate system plane composed of two objective function values of the present disclosure.

In step S46: individuals contained in first n ranks with minimum values of the rank are put into the preferred parent population, ensuring that individuals in first n−1 ranks are less than a specified population number, and crowding degree sorting is performed on individuals in an $n^{th}$ rank when individuals in first n ranks are more than the specified population number, as shown in FIG. 6, the crowding degree sorting meaning that all the individuals in the $n^{th}$ rank are put into a two-dimensional coordinate system plane composed of two objective function values according to the fitness values of the two objectives, left and right individuals closest to each of the individuals in the two-dimensional coordinate system plane are found, two closest individuals being called neighbors of a present individual, and a Manhattan distance of the two neighbors is calculated and recorded as a crowding degree of the present individual, where if the present individual has no neighbors, the crowding degree of the present individual is set to infinity, and according to the crowding degree, the individuals are sorted in descending order to obtain the crowding degree sorting; and last m individuals are deleted according to a sorting sequence of crowding degree to cause the total number of individuals in the first n ranks after a deletion operation is the specified population number.

In step S4, a method for performing a crossover operation on the preferred parent population includes the steps that: as shown in FIG. 7, two non-selected individuals are selected, whether to execute a crossover operation is decided according to the crossover probability, a node of the rule tree in the individual is randomly selected if the crossover operation is executed, a subtree with the node as a root node is exchanged, as shown in dotted line parts in FIG. 7, to obtain two new individuals, and the above steps are repeated until all individuals are executed for crossover operations.

In step S4, a method for performing a mutation operation on the preferred parent population includes the steps that: as shown in FIG. 8, a mutation operation is performed on the preferred parent population after the crossover operation: an individual decides whether to execute a mutation operation according to the mutation probability, a node of the rule tree in the individual is randomly selected if the mutation operation is executed, a node of another individual is randomly selected as a subtree of a root node to replace a subtree of the individual, as shown in dotted line parts in FIG. 8, to obtain a new individual, and the above operations are performed on all the individuals in the chromosome population to obtain a current generation chromosome population.

In step S8, a method for obtaining a non-dominated individual set includes the following steps.

In step S81: a Pareto dominated individual set P and a dominated individual set S of each of the individuals are calculated according to the scheduling schemes and the fitness values thereof of the individuals in the archive set in step S7.

In step S82: all individuals that are not dominated, namely, the individuals with empty sets S are found according to a Pareto dominated solution set of each of the individuals to form a non-dominated individual set.

The step S9 includes:
an appropriate scheduling scheme is selected according to demand preferences, the demand preference referring to a balance between two objectives of order completion time and energy consumption, and a required scheduling scheme is selected and executed.

EXAMPLES

As shown in FIG. 2, in order to facilitate the explanation of the problem, a job shop example is simplified, and the specific implementation process is as follows.

In step S1: information about processing robots, information about AGVs and information about workpieces to be processed of a flexible job shop in a training example are acquired: the number of processing robots is 3, and specific information is as shown in Table 1, where the technological processing capacity is 1, which means that the processing capability of this process is available, and an energy consumption speed is the energy consumed per second by the processing robot in the working process; the number of AGVs is 2, and specific information is as shown in Table 2, where a unit of running speed is meters per second, and an energy consumption speed is the energy consumed per second; and the number of workpieces is 4, and specific information is as shown in Table 3, where all orders appear at a moment 0; and parameters of the flexible job shop are initialized on the basis of the information about processing robots, the information about AGVs and the information about workpieces to be processed of the flexible job shop, and a multiple objective function for minimizing order completion time and energy consumption is constructed:

$$\min F=[C_{max}, E_{total}]^T$$

where $C_{max}$ is a completion time of a job shop order, and $E_{total}$ is total energy consumption of a job shop.

TABLE 1

| Information about processing robot | | | |
| --- | --- | --- | --- |
| Serial number of processing robot | Technological processing capacity | Energy consumption speed | Fixed-point position |
| 1 | 1 | 3 | (60, 30) |
| 2 | 1 | | |

TABLE 1-continued

Information about processing robot

| Serial number of processing robot | Technological processing capacity | Energy consumption speed | Fixed-point position |
|---|---|---|---|
|  | 1 | 3 | (50, 50) |
|  | 1 |  |  |
| 3 | 1 | 3 | (20, 40) |
|  | 1 |  |  |

TABLE 2

Information about AGV

| Serial number of AGV | Running speed | Energy consumption speed | Initial position |
|---|---|---|---|
| 1 | 3 | 2 | (0, 0) |
| 2 | 3 | 2 | (0, 0) |

TABLE 3

Workpiece information

| Serial number of workpiece | Serial number of working procedure | M1 | M2 | M3 |
|---|---|---|---|---|
| 1 | 1 | 30 | 50 |  |
|  | 2 |  | 60 | 50 |
|  | 3 | 50 |  | 30 |
| 2 | 1 |  | 50 | 50 |
|  | 2 | 30 | 30 |  |
|  | 3 | 60 |  | 40 |
| 3 | 1 | 40 | 50 | 20 |
|  | 2 | 50 | 20 |  |
|  | 3 |  |  | 50 |
| 4 | 1 | 20 |  | 40 |
|  | 2 |  | 50 |  |
|  | 3 |  |  | 40 |

In step S2: GP algorithm parameters are set, a chromosome population size is set as 30, a crossover probability is set as 0.95, a mutation probability is set as 0.05, the number of iterations is set as 50, a depth of a rule tree is set as 3, and a rule tree form is as shown in FIG. 3; and the chromosome population is initialized, a full method and a grow method are used to randomly generate half of the chromosomes, respectively, and a current number of iteration num is set to be 0.

In step S3: as shown in FIG. 4, fitness values of the individuals are evaluated through dynamic simulation according to the multiple objective function constructed in step S1.

A method for evaluating fitness values of individuals in the chromosome population through dynamic simulation includes the following steps.

In step S31: rule trees represented by individuals are decoded to obtain a priority function for a processing sequence of working procedures, a decoding process being hierarchical decoding, and an expression of each layer in the rule tree being the same level; and the decoding being started from leaf nodes of the lowest layer of the rule tree, a function set directly connected to the leaf nodes being taken as an operator, all leaf nodes of a next layer connected to the operator being formed by the operator as an operation expression, and the operation expression being regarded as a new leaf node to perform the above same calculation until the entire rule tree is decoded into an expression, namely, the priority function. The priority function of rule tree decoding shown in FIG. 3 is: (the number of remaining working procedures−processing time of working procedures)+no-load time of AGV.

In step S32: a corresponding numerical value related to each of the working procedures in the job shop is substituted into the priority function for calculation according to the above obtained priority function, to obtain a priority of each of the working procedures.

In step S33: a processing robot and an AGV that best meet an objective function are sequentially assigned to each of the working procedures according to the obtained priority sequence, to obtain scheduling schemes of all orders, and fitness values of two objectives of order completion time and energy consumption of the scheduling schemes are calculated. For example, the fitness values of the two objectives of all individuals in the initial chromosome population are shown in Table 4.

TABLE 4

Target fitness value of initial chromosome population

| Serial number of individual | Objective: order completion time | Objective: total energy consumption of job shop |
|---|---|---|
| 1 | 413 | 1722 |
| 2 | 520 | 1645 |
| 3 | 466 | 1684 |
| ... | ... | ... |
| 29 | 509 | 1792 |
| 30 | 470 | 1721 |

In step S4: as shown in FIG. 5, parent individuals are selected from the chromosome population by using a non-dominated rank and crowding degree sorting method, a population composed of the parent individuals is recorded as a preferred parent population, and individuals with the highest non-dominated rank in the preferred parent population are put into an archive set; and as shown in FIGS. 7 and 8, crossover and mutation operations are performed on the preferred parent population to obtain a current chromosome population.

In step S4, a method for selecting parent individuals from the chromosome population by using a non-dominated rank and crowding degree sorting method includes the following steps.

In step S41: a first generation chromosome population is directly taken as a preferred parent population and the following steps are skipped if a current generation chromosome set is a first generation chromosome, and a current generation chromosome $P_t$ and a previous generation chromosome are formed into a chromosome set $Q_t$ if a current generation chromosome set is not a first generation chromosome, and then the number of the chromosome set $Q_t$ is 60.

In step S42: a Pareto dominated individual set P and a dominated individual set S of each of the individuals are obtained according to fitness values of two objectives of order completion time and energy consumption of an individual in the above chromosome set $Q_t$. For example, a Pareto dominated individual set P of an individual 1 in Table 4 includes an individual 29 and an individual 30, and a dominated individual set S of the individual 1 is empty.

In step S43: the non-dominated rank is set as rank, and an initial value of rank is set as 0.

In step S44: all individuals that are not dominated, namely, individuals with empty sets S, are found according to a Pareto dominated solution set of each of the individuals to form a non-dominated individual set, among individuals shown in Table 4, individuals that are not dominated include an individual 1, an individual 2 and an individual 3, ranks of the individuals in the non-dominated individual set being all increased by 1.

In step S45: individuals with minimum values of the above rank are deleted, namely, the individual 1, the individual 2 and the individual 3, and S sets of individuals in a P set are updated according to the P set of the individual, that is, individuals with minimum values of the rank in the S set are deleted; and whether there is an individual with an unlabeled rank in the chromosome set is determined, if so, step S44 is skipped to; and if not, individuals with the highest rank are stored into the archive set after ranks are labeled, that is, individuals with minimum values of the ranks are stored into the archive set, for example, individuals in an initial chromosome set stored in the archive set are the individual 1, individual 2 and individual 3, and step S46 is skipped to.

In step S46: individuals contained in first n ranks with minimum values of the ranks are put into the preferred parent population, ensuring that individuals in first n−1 ranks are less than a specified population number; if individuals in first n ranks are more than the specified population number, for example, in a second iteration, the number of individuals in first 3 ranks in the non-dominated rank is 28, and the number of individuals in first 4 ranks in the non-dominated rank is 34, crowding degree sorting is performed on individuals in a fourth rank, as shown in FIG. 6; according to the crowding degree, the individuals are sorted in descending order to obtain the crowding degree sorting; and last 4 individuals are deleted according to a sorting sequence of crowding degree to cause the total number of the individuals in the first n ranks after a deletion operation is the specified population number of 30.

In step S4, a method for performing a crossover operation on the preferred parent population includes the steps that: as shown in FIG. 7, two non-selected individuals are selected, whether to execute a crossover operation is decided according to the crossover probability, a node of the rule tree in the individual is randomly selected if the crossover operation is executed, a subtree with the node as a root node is exchanged, subtrees to be exchanged are shown in dotted line parts in FIG. 7, to obtain two new individuals, and the above steps are repeated until all individuals are executed for crossover operations.

In step S4, a method for performing a mutation operation on the preferred parent population includes the steps that: as shown in FIG. 8, a mutation operation is performed on the preferred parent population after the crossover operation: an individual decides whether to execute a mutation operation according to the mutation probability, a node of the rule tree in the individual is randomly selected if the mutation operation is executed, a node of another individual is randomly selected as a subtree of a root node to replace a subtree of the individual, subtrees that needs to be replaced are shown in dotted line parts in FIG. 8, to obtain a new individual, and the above operations are performed on all the individuals in the chromosome population to obtain a current generation chromosome population.

In step S5: whether a current number of iteration num reaches a set value NUM is determined, if so, this operation is ended and step S6 is entered; and if not, the current number of iteration num is increased by 1, the current chromosome population is taken as a chromosome population, and step S3 is entered.

In step S6: information about processing robots, information about AGVs and information about workpieces to be processed of a flexible job shop in a test example are acquired: the number of processing robots is set as 4, and specific information is as shown in Table 5, where the technological processing capacity is 1, which means that the processing capability of this process is available, and an energy consumption speed is the energy consumed per second by the processing robot in the working process; the number of AGVs is 3, and specific information is as shown in Table 6, where a unit of running speed is meters per second, and an energy consumption speed is the energy consumed per second; and the number of workpieces is 6, and specific information is as shown in Table 7, where dynamic orders 5 and 6 appear at moments 100 and 200, respectively, and remaining orders appear at a moment 0; and parameters of the flexible job shop are initialized on the basis of the information about processing robots, the information about AGVs and the information about workpieces to be processed of the flexible job shop.

TABLE 5

Information about processing robot

| Serial number of processing robot | Technological processing capacity | Energy consumption speed | Fixed-point position |
|---|---|---|---|
| 1 | 1 1 | 3 | (60, 30) |
| 2 | 1 1 | 3 | (50, 50) |
| 3 | 1 1 | 3 | (20, 40) |
| 4 | 1 1 1 | 3 | (35, 45) |

TABLE 6

Information about AGV

| Serial number of AGV | Running speed | Energy consumption speed | Initial position |
|---|---|---|---|
| 1 | 3 | 2 | (0, 0) |
| 2 | 3 | 2 | (0, 0) |
| 3 | 3 | 2 | (0, 0) |

TABLE 7

Workpiece information

| Serial number of workpiece | Serial number of working procedure | M1 | M2 | M3 | M4 |
|---|---|---|---|---|---|
| 1 | 1 |  |  | 40 | 60 |
|  | 2 | 30 | 60 |  | 40 |
|  | 3 | 50 | 50 | 30 |  |
| 2 | 1 | 40 | 50 | 50 |  |
|  | 2 |  |  | 60 | 40 |
|  | 3 | 20 | 40 |  | 30 |
| 3 | 1 | 60 | 50 | 20 |  |
|  | 2 | 50 | 20 |  |  |
|  | 3 |  |  | 50 | 40 |
| 4 | 1 | 20 |  | 40 |  |
|  | 2 |  | 50 |  | 50 |
|  | 3 | 30 |  | 40 |  |
| 5 (dynamic order) | 1 | 40 | 70 |  |  |
|  | 2 | 60 | 30 | 80 |  |
|  | 3 |  | 40 |  | 70 |

TABLE 7-continued

Workpiece information

| Serial number of workpiece | Serial number of working procedure | M1 | M2 | M3 | M4 |
|---|---|---|---|---|---|
| 6 (dynamic order) | 1 | 70 | 50 | | |
| | 2 | | 20 | 80 | 60 |
| | 3 | | 30 | 50 | 20 |

In step S7: dynamic simulation evaluation is performed by using scheduling rules represented by 71 individuals in the archive set, and corresponding scheduling schemes and fitness values thereof are obtained. The results are shown in Table 8.

TABLE 8

Dynamic simulation results of individuals in archive set

| Serial number of individual | Objective: order completion time | Objective: total energy consumption of job shop |
|---|---|---|
| 1 | 623 | 2135 |
| 2 | 659 | 2048 |
| 3 | 660 | 2106 |
| ... | ... | ... |
| 69 | 609 | 2076 |
| 70 | 621 | 2089 |
| 71 | 642 | 2143 |

In step S8: the obtained fitness values of the scheduling schemes are compared to obtain a non-dominated individual set.

In step S8, a method for obtaining a non-dominated individual set includes the following steps.

In step S81: a Pareto dominated individual set P and a dominated individual set S of each of the individuals are calculated according to the scheduling schemes and the fitness values thereof of the individuals in the archive set in step S7.

In step S82: all individuals that are not dominated, namely, the individuals with empty sets S, are found according to a Pareto dominated solution set of each of the individuals to form a non-dominated individual set. The obtained non-dominated individual set includes: an individual 6 (612, 2103), an individual 27 (657, 2032), an individual 43 (662, 2018), an individual 60 (630, 2028) and an individual 70 (621, 2089), where two values in brackets are the order completion time and the total energy consumption of job shop.

In step S9: an appropriate scheduling scheme is selected according to demand preferences, followed by executing. If a demand preference is that a completion time of job shop is expected to be the shortest, a scheduling rule and a scheduling scheme represented by the above individual 6 (612, 2103) are selected and executed; if a demand preference is that the total energy consumption of job shop is expected to be the smallest, a scheduling rule and a scheduling scheme represented by the above individual 43 (662, 2018) are selected and the selected appropriate scheduling scheme is executed; and if a demand preference is that the two objectives of order completion time and energy consumption are moderate, a scheduling rule and a scheduling scheme represented by the above individual 60 (630, 2028) are selected and executed.

An example of the present disclosure also provides a computer-readable storage medium, having a computer program stored thereon, which, when executed by a processor, implements each of processes of examples of the above large-scale dynamic double-effect scheduling method for a flexible job shop based on GP, and the same technical effect can be realized. In order to avoid repetition, the description will not be repeated.

The above specific examples merely describe the design principles of the present disclosure, and the shapes and names of components in the description can be different and unlimited. Therefore, in the present disclosure, the technical solutions described in the previous examples can be modified or replaced by those skilled in the art. These modifications and replacements do not depart from the creative purpose and technical solutions of the present disclosure, and all belong to the protection scope of the present disclosure.

The invention claimed is:

1. A large-scale dynamic double-effect scheduling method for a flexible job shop based on genetic programming (GP), comprising the steps of:
    step S1: acquiring information about processing robots, information about automated guided vehicles (AGVs) and information about workpieces to be processed of a flexible job shop in a training example; and initializing parameters of the flexible job shop on the basis of the information about processing robots, the information about AGVs and the information about workpieces to be processed of the flexible job shop, and constructing a multiple objective function for minimizing order completion time and energy consumption;
    step S2: setting GP algorithm parameters, constructing individuals in a rule tree form, initializing a chromosome population, and setting a current number of iteration as 0;
    step S3: evaluating fitness values of individuals in the chromosome population through dynamic simulation according to the multiple objective function constructed in step S1;
    step S4: selecting parent individuals from the chromosome population by using a non-dominated rank and crowding degree sorting method, recording a population composed of the parent individuals as a preferred parent population, and putting individuals with the highest non-dominated rank in the preferred parent population into an archive set; and performing crossover and mutation operations on the preferred parent population to obtain a current chromosome population;
    step S5: determining whether a current number of iteration reaches a set value NUM, if so, step S6 being entered; and if not, the current number of iteration being increased by 1, the current chromosome population being taken as a chromosome population, and step S3 being entered;
    step S6: acquiring information about processing robots, information about AGVs and information about workpieces to be processed of a flexible job shop in a test example; and initializing parameters of the flexible job shop on the basis of the information about processing robots, the information about AGVs and the information about workpieces to be processed of the flexible job shop;
    step S7: performing dynamic simulation by using scheduling rules represented by the individuals in the archive set in step S4, and obtaining corresponding scheduling schemes and fitness values thereof;
    step S8: comparing the obtained fitness values of the scheduling schemes to obtain a non-dominated individual set; and step S9: selecting an appropriate scheduling scheme according to demands, followed by executing to complete double-effect scheduling;

in step S1, the information about processing robots comprising the number of processing robots, the technological processing capacity of processing robots and fixed-point positions of processing robots;

the information about AGVs comprising the number of AGVs, running speeds of AGVs and initial positions of AGVs;

the information about workpieces to be processed comprising the number of workpieces to be processed, the number of working procedures for the workpieces to be processed, and available processing robots for each of working procedures and processing durations thereof; and the constructed multiple objective function being:

$$\min F=[C_{max}, E_{total}]^T$$

where $C_{max}$ is a completion time of a job shop order, and $E_{total}$ is total energy consumption of a job shop.

2. The large-scale dynamic double-effect scheduling method for a flexible job shop based on GP according to claim 1, wherein in step S2, the GP algorithm parameters comprise a chromosome population size, a crossover probability, a mutation probability, the number of iterations and a depth of a rule tree;

the individuals in the rule tree form are constructed, each of the individuals represents a scheduling rule, and the rule tree is a priority function composed of a terminal set and a function set, the terminal set reflecting features of a job shop state being taken as leaf nodes of the rule tree, and the features of the job shop state reflected by the terminal set comprising the number of remaining working procedures, processing time of working procedures and a time for a workpiece to wait for an AGV to arrive; and the function set, as a function symbol, comprising $\{+, -, \times, =, \max, \min, \text{if}\}$, and the function symbol associating the features of the job shop as internal nodes of the rule tree to generate a rule tree; and the chromosome population comprises N chromosomes, and each of the chromosomes is a rule tree; generation methods for the chromosome population comprise a full method and a grow method, and the two generation methods separately generate half of the chromosome population; in the full method, a complete tree is constructed, leaf nodes are all at the maximum depth level, the leaf nodes are randomly selected from the terminal set, and remaining nodes are all selected from the terminal set; and in the grow method, a complete tree does not require to be constructed, all nodes may be randomly selected from the terminal set and the function set, and terminal symbols are selected as leaf nodes and function symbols are selected as internal nodes through probabilities to recursively construct a rule tree, to generate individuals with different depths and structures.

3. A non-transitory computer-readable storage medium, having a computer program stored thereon, which, when executed by a processor, implements a large-scale dynamic double-effect scheduling method for a flexible job shop based on GP according to claim 2.

4. The large-scale dynamic double-effect scheduling method for a flexible job shop based on GP according to claim 1, wherein in step S3, a method for evaluating fitness values of individuals in the chromosome population through dynamic simulation comprises the steps of:

step S31: decoding rule trees represented by individuals to obtain a priority function for a processing sequence of working procedures, a decoding process being hierarchical decoding, and an expression of each layer in the rule tree being the same level; and the decoding being started from leaf nodes of the lowest layer of the rule tree, a function set directly connected to the leaf nodes being taken as an operator, all leaf nodes of a next layer connected to the operator being formed by the operator as an operation expression, and the operation expression being regarded as a new leaf node to perform the above same calculation until the entire rule tree is decoded into an expression, namely, the priority function;

step S32: substituting a corresponding numerical value related to each of the working procedures in the job shop into the priority function for calculation according to the above obtained priority function, to obtain a priority of each of the working procedures; and step S33: sequentially assigning a processing robot and an AGV that best meet an objective function to each of the working procedures according to the obtained priority, to obtain scheduling schemes of all orders, and calculating fitness values of two objectives of order completion time and energy consumption of the scheduling schemes.

5. The large-scale dynamic double-effect scheduling method for a flexible job shop based on GP according to claim 1, wherein in step S4, a method for selecting parent individuals from the chromosome population by using a non-dominated rank and crowding degree sorting method comprises the steps of:

step S41: directly taking a first generation chromosome population as a preferred parent population if a current generation chromosome set is a first generation chromosome, and forming a current generation chromosome $P_1$ and a previous generation chromosome into a chromosome set $Q_1$ if a current generation chromosome set is not a first generation chromosome;

step S42: obtaining a Pareto dominated individual set P and a dominated individual set S of each of the individuals according to fitness values of two objectives of order completion time and energy consumption of an individual in the above chromosome set $Q_1$, a Pareto dominated individual meaning that, in a minimization problem, if a certain target fitness value of an individual A is less than or equal to a corresponding target fitness value of an individual B, and another target fitness value of the individual A is less than the corresponding target fitness value of the individual B, the individual A dominates the individual B, and the individual B is a Pareto dominated individual of the individual A;

step S43: setting the non-dominated rank as rank, and setting an initial value of rank as 0;

step S44: finding all individuals that are not dominated, namely, individuals with empty sets S, according to a Pareto dominated solution set of each of the individuals to form a non-dominated individual set, ranks of individuals in the non-dominated individual set being all increased by 1;

step S45: deleting individuals with minimum values of the above rank, and updating S sets of individuals in a P set according to the P set of the individual, namely, deleting individuals with minimum values of the rank in the S set; and determining whether an individual with an unlabeled rank exists in the chromosome set, if so, step S44 being skipped to; and if not, individuals with the highest rank being stored into the archive set after ranks are labeled, that is, individuals with minimum values of the rank being stored into the archive set, and step S46 being skipped to; and step S46: putting individuals contained in first n ranks with minimum values of the rank into the preferred parent population, ensuring that individuals in first n−1 ranks are less than a specified population number, and performing crowding degree sorting on individuals in an $n^{th}$ rank when individuals in first n ranks are more than the specified population number, the crowding degree sorting meaning that all the individuals in the $n^{th}$ rank are put into a two-dimensional coordinate system plane composed of two objective function values according to the fitness values of the two objectives, left and right individuals closest to each of the individuals in the two-dimensional coordinate system plane are found, two closest individuals being called neighbors of a present individual, and a Manhattan distance of the two neighbors is calculated and recorded as a crowding degree of the present individual, wherein if the present individual has no neighbors, the crowding degree of the present individual is set to infinity, and the individuals are sorted in descending order according to the crowding degree to obtain the crowding degree sorting; and last m individuals are deleted according to a sorting sequence of crowding degree to cause the total number of the individuals in the first n ranks after a deletion operation is the specified population number.

6. The large-scale dynamic double-effect scheduling method for a flexible job shop based on GP according to claim 1, wherein in step S4, a method for performing a crossover operation on the preferred parent population comprises the steps of:

selecting two non-selected individuals, deciding whether to execute a crossover operation according to the crossover probability, randomly selecting a node of the rule tree in the individual if the crossover operation is executed, exchanging a subtree with the node as a root node to obtain two new individuals, and repeating the above steps until all individuals are executed for crossover operations.

7. The large-scale dynamic double-effect scheduling method for a flexible job shop based on GP according to claim 6, wherein in step S4, a method for performing a mutation operation on the preferred parent population comprises the steps of:

performing a mutation operation on the preferred parent population after the crossover operation: deciding, by an individual, whether to execute a mutation operation according to the mutation probability, randomly selecting a node of the rule tree in the individual if the mutation operation is executed, randomly selecting a node of another individual as a subtree of a root node to replace a subtree of the individual to obtain a new individual, and performing the above operations on all the individuals in the chromosome population to obtain a current generation chromosome population.

8. The large-scale dynamic double-effect scheduling method for a flexible job shop based on GP according to claim 7, wherein in step S8, a method for obtaining a non-dominated individual set comprises the steps of:

step S81: calculating a Pareto dominated individual set P and a dominated individual set S of each of the individuals according to the scheduling schemes and the fitness values thereof of the individuals in the archive set in step S7; and step S82: finding all individuals that are not dominated, namely, individuals with empty sets S, according to a Pareto dominated solution set of each of the individuals to form a non-dominated individual set.

9. The large-scale dynamic double-effect scheduling method for a flexible job shop based on GP according to claim 1, wherein in step S9, an appropriate scheduling scheme is selected according to demands, the demand referring to a balance between two objectives of order completion time and energy consumption, and a required scheduling scheme is selected and executed.

10. A non-transitory computer-readable storage medium, having a computer program stored thereon, which, when executed by a processor, implements a large-scale dynamic double-effect scheduling method for a flexible job shop based on GP according to claim 1.

* * * * *